3,280,092
PRODUCTION OF POLYPROPYLENE
James T. Edmonds, Jr., Bartlesville, Okla., assignor to Phillips Petroleum Company, a corporation of Delaware
No Drawing. Filed June 12, 1958, Ser. No. 741,462
11 Claims. (Cl. 260—93.7)

This invention relates to the production of polypropylene. In one aspect, the invention relates to an improved method for polymerizing propylene and to a novel catalyst therefor.

Reactions for polymerizing olefins are well known in the art and are generally carried out in the presence of catalysts. One type of catalyst which has recently been disclosed for use in the polymerization of monoolefins, particularly ethylene, consists of an organometal compound, e.g., triethylaluminum, and a compound of a heavy metal, e.g., titanium tetrachloride. It has also been found that when propylene is polymerized with this type of catalyst to a solid, high molecular weight polymer, a certain percentage of the polymer formed has a regular structure. The portion of the polypropylene having this regular structure is highly crystalline and is generally referred to as isotactic polypropylene. The amount of isotactic polypropylene contained in the total polymer product formed in any given polymerization appears to be dependent upon the particular catalyst system employed. For example, it is stated in the literature that titanium tricholoride provides a higher isotactic content in polypropylene than does titanium tetrachloride when an organometal such as triethylaluminum is utilized as the other catalyst component.

It is an object of this invention to provide an improved process for producing polypropylene.

Another object of the invention is to provide a process for preparing polypropylene in which increased yields of solid, high molecular weight polypropylene are obtained.

A further object of the invention is to provide a novel catalyst for use in the polymerization of propylene.

Other and further objects and advantages of the invention will become apparent to those skilled in the art upon consideration of the accompanying disclosure.

The instant invention resides in an improved process for polymerizing propylene and in a catalyst for effecting this polymerization. Broadly speaking, the process comprises contacting propylene in the presence of a hydrocarbon diluent, liquid and inert under conditions of the process, with a catalyst comprising (1) an organoaluminum compound, and (2) the reaction product obtained by reacting aluminum and titanium tetrachloride. The second component of the instant catalyst system, i.e., the reaction product of aluminum and titanium tetrachloride, contains titanium, aluminum and chlorine. The form in which these elements are present in the reaction product is not completely understood. It appears that the titanium, aluminum, and chlorine are present in the reaction mixture in some complex form, the exact nature of which is unknown. The catalyst system of this invention is, therefore, broadly defined as comprising (1) an organoaluminum compound, and (2) the reaction product of aluminum and titanium tetrachloride.

The organoaluminum component of the instant catalyst system corresponds to the general formula $AlR_3$, wherein R is a radical selected from the group consisting of alkyl, cycloalkyl, aryl, aralkyl, alkaryl, alkylcycloalkyl, and cycloalkylalkyl. The radical R preferably contains from 1 to 10, inclusive, carbon atoms. Examples of suitable organoaluminum compounds includes triethyl aluminum, tri-n-propylaluminum, triisopropylaluminum, tri-n-butylaluminum, triisobutylaluminum, tri-tert-butylaluminum, the triamylaluminum, including tri-n-amylaluminum, tri-n-hexylaluminum, tricyclopentylaluminum, tricyclohexylaluminum, triphenylaluminum, trinaphthylaluminum, the tritolylaluminums, tribenzylaluminum, tri-(phenylethyl) - aluminum, methyldiethylaluminum, dimethyl-n-propylaluminum, tri(cyclohexylethyl)aluminum, tri(4-ethylcyclohexyl)aluminum, and the like.

As previously mentioned, the second component of the instant catalyst system is formed by reacting aluminum with titanium tetrachloride. This reaction is generally carried out at an elevated temperature, e.g., at a temperature in the range of 300 to 650° F. It is usually preferred to operate at a temperature in the range of 375 to 450° F. The reaction period is, in general, of such duration that the reaction of the materials is substantially complete. Usually, a period of from 0.1 to 20 hours or longer is sufficient to effect this reaction. It is preferred that a reaction period of at least 10 hours, e.g., from 10 to 20 hours, be used when conducting the reaction in the preferred temperature range of 375 to 450° F. In carrying out the reaction of the aluminum with titanium tetrachloride, the amount of titanium tetrachloride used is usually in the range of 2.5 to 5.0, preferably 2.9 to 3.5 mols of titanium tetrachloride per mol of aluminum. It is particularly desirable to use mol ratio of about 3 mols of titanium tetrachloride per mol of aluminum since the highest yields of polypropylene are thereby generally obtained. The reaction is carried out under a blanket of an inert gas in order to prevent contact of the reaction mixture with air, moisture, or other inactivating materials.

It is usually preferred to treat the reaction product of aluminum and titanium tetrachloride, prepared as described hereinbefore, by heating it under a vacuum in order to remove any volatile materials. In this treatment, the reaction product is heated to a temperature in the range of 250 to 800° F., preferably from 400 to 600° F., and is maintained at this temperature for a period of time sufficient to ensure the removal of any volatile materials, e.g., from 10 to 20 hours. This heating step is preferably carried out under a vacuum, e.g., at pressures of from 0.02 to 100 mm. mercury absolute. An alternative, but not necessarily equivalent, method for treating the reaction product is to subject the reaction product to extraction with a hydrocarbon in order to remove soluble materials. The extraction can be conducted, for example, at temperatures in the range of 150 to 280° F., using a paraffinic, cycloparaffinic or aromatic hydrocarbon, such as n-heptane, cyclohexane, benzene, toluene, or the like. It has been discovered that if the reaction product is treated by one or other of the above-described methods, improved yields of polypropylene are obtained when the treated material is used in the catalyst system of this invention to polymerize propylene. However, it is to be understood that good results can be obtained when the catalyst includes the untreated reaction product of aluminum and titanium tetrachloride. It is not intended, therefore, that the invention should be limited to a catalyst which comprises an organoaluminum compound and a treated reaction product of aluminum and titanium tetrachloride.

The amount of the catalyst of this invention which is used in the polymerization of propylene can vary over a rather wide range. However, the concentration of catalyst in the reaction zone is generally in the range between 0.01 and 10 weight percent of the diluent used. The amount of propylene charged to the reaction zone is usually in the range of 0.5 to 10 weight percent of the diluent present in that zone.

The weight ratio of the aluminum-titanium tetrachloride reaction product to the organoaluminum compound is usually in the range of 0.0035:1 to 7.0:1. It is preferred that the weight ratio of the components of the instant catalyst system be in the range of 0.02:1 to 1:1.

Suitable diluents for use in the polymerization process are paraffins, cycloparaffins, and/or aromatic hydrocarbons, which are relatively inert, non-deleterious and liquid under the conditions of the process. The lower molecular weight alkanes, such as propane, butane and pentane, are particularly useful in carrying out the process at low temperatures. However, the higher molecular weight paraffins and cycloparaffins, such as isooctane, cyclohexane and methylcyclohexane, and the aromatic hydrocarbons, such as benzene, toluene, and the like, can also be used, especially when operating at higher temperatures.

The polymerization process of this invention is carried out at a temperature in the range of 0 to 500° F., preferably between 150 and 350° F. Although pressures ranging from atmospheric and below up to 30,000 p.s.i.g. or higher can be employed, a pressure from 50 to 1500 p.s.i.g. is usually preferred. Since the instant process is carried out in the presence of a hydrocarbon diluent, the pressure used should be sufficient to maintain the diluent in the liquid phase.

The process of this invention can be carried out as a batch process, for example, by pressuring the propylene into a reactor containing the catalyst and the diluent. It is to be understood that any suitable order of addition can be used although it is preferred to charge the diluent, catalyst components and propylene to the reactor in that order. Also, the process can be carried out continuously by maintaining the above-described concentration of reactants in the reactor for a suitable residence time. The catalyst components can be charged to the reactor individually, or they can be mixed prior to their addition. The residence time used in a continuous process can vary widely, since it depends to a great extent upon the temperature at which the process is carried out. However, the residence time for polymerizing the propylene in the preferred temperature range of 150 to 350° F. usually falls within the range of one second to an hour or more. In the batch process, the time for the reaction can also vary widely, such as up to 24 hours or more.

It has been found that various materials in some instances may have a tendency to inactivate the catalyst composition of this invention. These materials include carbon dioxide, oxygen and water. Accordingly, it is usually desirable to free the propylene from these materials, as well as from other materials which may tend to inactivate the catalyst, before contacting the monomer with the catalyst. Any of the known means for removing such contaminants can be employed. A suitable method for purifying the propylene is to scrub the olefin with sodium hydroxide to remove carbon dioxide and hydrogen sulfide, followed by scrubbing with an alkaline aqueous pyrogallol solution to remove oxygen. After these scrubbing steps, the propylene can be dried by contacting it with a desiccant, such as silica gel. The diluent used in the process should also be freed of contaminants, such as water, oxygen, and the like. It is desirable also that air and moisture be removed from the reaction vessel before the reaction is carried out. However, in some cases, small amounts of catalyst-inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess propylene is vented and the contents of the reactor, including the polymer and diluent, are then treated by any suitable method to inactivate the catalyst and remove the catalyst residues. In one treating method, the inactivation of the catalyst is readily accomplished by washing with an alcohol, water or other suitable material. It is usually preferred to add an amount of the catalyst-inactivating material sufficient for inactivating the catalyst while avoiding precipitation of the polymer. Thereafter, the polymer can be recovered from solution by any suitable means, e.g., by flashing off the diluent, by water coagulation, or by the addition of a precipitating agent, such as alcohol. When the polymer is coagulated or precipitated from solution, it can then be separated from the diluent and treating agents by decantation, filtration, or the like. It is to be understood that the catalyst-inactivating step and the polymer precipitation step can be conducted in a single operation by adding a sufficient amount of a catalyst-inactivating material such as alcohol. The above-described treating procedures result in the removal of a large proportion of the catalyst residues which may be associated with the polymer product. If desired, the solid polymer product can be washed with materials such as methanol, acetone, and the like, in order to remove additional catalyst residues. This washing is preferably carried out in a comminutor, such as a Waring Blendor, which cuts the polymer into small particles. Another method which can be advantageously used in removal of the catalyst comprises washing the polymer with water while the polymer is in solution in a hydrocarbon diluent. This latter method for treating the polymer is described in detail in copending U.S. patent application Serial No. 605,635, filed August 22, 1956, by W. B. Reynolds et al., and now U.S. Patent 2,886,561.

A more comprehensive understanding of the invention can be obtained by referring to the following illustrative examples which are not intended, however, to be unduly limitative of the invention.

*Example 1*

A series of runs was conducted according to this invention in which a catalyst consisting of triisobutylaluminum and the reaction product of aluminum and titanium tetrachloride was used to polymerize propylene. In preparing the aluminum-titanium tetrachloride reaction product, glass tubes were charged with aluminum powder and titanium tetrachloride. The tubes were then flushed with prepurified nitrogen, sealed and heated in a rocking autoclave for 12 hours at 425° F. Following the reaction period, the reaction product was transferred to open glass tubes and heated for 16 hours at 450° F. and under an absolute pressure of 0.05 mm. Hg.

The polymerization runs were carried out in a 1-gallon reactor provided with a mechanical stirrer. In each run, the triisobutylaluminum and the aluminum-titanium tetrachloride reaction product, prepared as described above, were charged to the reactor which contained 1500 ml. of prepurified cyclohexane as the diluent. Polymerization, which was immediately initiated upon charging the propylene, was carried out at a temperature between 200 and 260° F. and at a pressure of 300 p.s.i.g. for 2 hours. The propylene used in this and succeeding examples was a pure grade propylene which had been previously purified by drying over silica gel and passing over high surface sodium dispersed on sodium chloride. The results of the runs and other pertinent information are set forth hereinbelow in Table I.

TABLE I

| Run No. | 1 | 2 | 3 | 4 | 5[1] |
|---|---|---|---|---|---|
| Al-TiCl₄ Reaction Product Preparation: | | | | | |
| TiCl₄, grams | 43.15 | 43.15 | 43.15 | 43.15 | 43.15 |
| Al, grams | 1.85 | 1.95 | 2.05 | 2.15 | 2.25 |
| Mol Ratio TiCl₄/Al | 3.32 | 3.14 | 2.99 | 2.85 | 2.72 |
| Polymerization: | | | | | |
| Triisobutylaluminum, grams | 2.32 | 2.32 | 2.32 | 2.32 | 2.32 |
| TiCl₄-Al Reaction Product, gms | 0.6 | 0.6 | 0.6 | 0.6 | 0.6 |
| Polymer yield, grams | 460 | 472 | 487 | 350 | 327 |
| Weight Ratio Reaction Product/Triisobutylaluminum | 0.258 | 0.258 | 0.258 | 0.258 | 0.258 |
| Productivity, gms. polymer/gm. catalyst/hour | 78.1 | 81.0 | 83.5 | 60.0 | 56.2 |
| Isotactic Content, percent [2] | 65 | 63 | 60 | 56 | 52 |

[1] Two runs were carried out at this level and the productivity shown, namely, 327, is the average of these runs, 306 and 348, respectively.
[2] As determined by extraction with refluxing n-heptane.

*Example II*

Another series of runs was carried out according to this invention in which propylene was polymerized in the presence of a catalyst consisting of triisobutylaluminum and the reaction product of aluminum and titanium tetrachloride. In these runs, the aluminum-titanium tetrachloride reaction product was prepared by reacting 1.95 grams of aluminum with 43.15 grams of titanium tetrachloride at temperatures in the range of 425 to 490° F. for a period of 12 hours. The mol ratio of titanium tetrachloride to aluminum was 3.14. Five runs in all were carried out in this series, and in four of the runs the aluminum-titanium tetrachloride reaction product was heated in unsealed glass tubes for 16 hours at 450° F. and at an absolute pressure of 0.05 mm. Hg. A sample of the reaction product of one of the four runs was analyzed, and the following analysis was obtained:

| Element: | Weight percent |
|---|---|
| Ti | 26.2 |
| Al | 3.7 |
| Cl | 69.6 |

This analysis corresponds to an empirical formula of $Ti_{3.98}Al_1Cl_{14.3}$.

In the fifth run, the reaction product was extracted with toluene. In this extraction run, the aluminum-titanium tetrachloride reaction product was emptied into a 2-liter flask, and 1 liter of toluene, which had been refluxed over sodium and distilled, was added to the flask. The flask contents, which were then heated while stirring, were maintained at 175° F. for 30 minutes. The liquid was then removed by suction, leaving the aluminum-titanium tetrachloride reaction product on a fritted disk present in the bottom of the flask. Any toluene remaining in this solid material was removed by heating the material to 175° F. for 2 hours at an absolute pressure of 0.05 mm. Hg.

In the five polymerization runs, which were conducted in apparatus similar to that described in Example I, 2.32 grams of triisobutylaluminum and 0.6 gram of the aluminum-titanium tetrachloride reaction product, prepared as described above, were employed. These amounts represent a weight ratio of the reaction product to triisobutylaluminum of 0.258. The catalyst components were charged to the reactor which contained 1500 ml. of pre-purified cyclohexane. The polymerizations, which were initiated upon charging of the propylene, were carried out at a temperature between 200 and 260° F. and at a pressure of 300 p.s.i.g. for two hours. The results of these runs are shown hereinbelow in Table II.

TABLE II

| Run No. | 6 | 7 | 8 | 9 | 10[1] |
|---|---|---|---|---|---|
| Reaction Product Preparation Temperature, °F | 425 | 450 | 475 | 490 | 425 |
| Propylene Polymerization Productivity, gms. polymer/gram catalyst/hour | 68 | 45 | 52 | 50 | 59 |
| Polymer Properties: | | | | | |
| Isotactic content, percent [2] | 65 | 76 | 65 | 74 | 65 |
| Inherent Viscosity [3] | 3.15 | 2.40 | 3.14 | 3.29 | 3.77 |
| Melt Index [4] | 0.26 | 0.49 | 0.25 | 0.18 | 0.56 |
| Specific Gravity, gm./cc. at room temperature | 0.897 | 0.899 | 0.899 | 0.902 | 0.898 |
| Izod Impact Strength, ft. lbs./in. notch [5] | 4.0 | 1.8 | 3.3 | 3.1 | 2.2 |
| Stiffness, p.s.i [6] | 75,000 | 83,000 | 70,000 | 74,000 | 76,000 |
| Tensile Strength, comp. molded [7] at— | | | | | |
| Yield, p.s.i | 2,934 | 3,060 | 3,018 | 2,944 | 2,884 |
| Break, p.s.i | 2,102 | 3,060 | 2,096 | 2,944 | 2,012 |
| Elongation, comp. molded [7] at Break, percent | 96 | 41 | 63 | 45 | 45 |
| Zero Strength Temp., °F.[8] | 275 | 260 | 284 | 290 | 275 |

[1] Run in which Al-TiCl₄ reaction product was extracted with toluene.
[2] As determined by extraction with refluxing n-heptane.
[3] Determined by method of Kemp et al., I & E Chem. Vol. 35, page 1108 (1943).
[4] ASTM D-1238-52T.
[5] ASTM D-256-54T.
[6] ASTM D-747-50.
[7] ASTM D-412-51T (Type C die).
[8] Essentially by method of Islyn Thomas, Injection Molding of Plastics, Reinhold Publishing Company, page 504 (1947).

*Example III*

Two polymerization runs were carried out according to this invention in which propylene was polymerized to high molecular weight polymer using a catalyst consisting of triisobutylaluminum and the reaction product of aluminum and titanium tetrachloride.

In preparing the aluminum-titanium tetrachloride reaction product, eight 19-millimeter tubes were sealed at one end, cleaned and dried. The tubes were then flushed with nitrogen, and 1.95 grams of aluminum powder was then added to each tube. Twenty-five milliliters of titanium tetrachloride was then added to each of the tubes. The amounts added represent a mol ratio of titanium tetrachloride to aluminum of 3.15. The tubes were then flushed with nitrogen and sealed, after which they were placed in a rocking autoclave containing cyclohexane as a heat transfer medium. The autoclave was heated to 410° F. and maintained at this temperature overnight. The autoclave was then cooled and opened, and the tubes were removed. The tubes were partially filled with a purple solid material. A portion of this material, hereinafter designated as unpurified reaction product, was later used without further treatment in a polymerization run. A portion of the material recovered from the glass tubes was transferred to an open glass tube and heated at 450° F. for 17 hours at an absolute pressure of 0.07 mm. Hg. This latter material, hereinafter designated as purified reaction product, was used in a second polymerization run.

The purified aluminum-titanium tetrachloride reaction product was analyzed and the following analysis obtained:

| Element: | Weight, percent |
|---|---|
| Ti | 26.74 |
| Al | 3.67 |
| Cl | 70.2 |

The foregoing analysis corresponds to an empirical formula of $Ti_{4.1}Al_1Cl_{14.6}$.

Two polymerization runs were carried out in which propylene was polymerized in the presence of a catalyst consisting of triisobutylaluminum and the aluminum-titanium tetrachloride reaction product prepared as above described. The first of these runs, designated as Run A, used the unpurified reaction product while the second run, namely, Run B, employed the purified reaction product. In each of the runs, an amount of the reaction product was weighed out under nitrogen and then added to a 1-gallon reactor containing 1000 ml. of cyclohexane which had been previously purged with prepurified nitrogen. The addition of this material to the reactor was carried out while flushing the top of the reactor with nitrogen. The reactor was then closed and flushed twice at 100 p.s.i.g. with prepurified nitrogen. The desired amount of triisobutylaluminum was then charged through a charging tube as a solution in 500 ml. of cyclohexane. The charging tube was then rinsed by passing an additional 500 ml. of prepurified cyclohexane through the tube and into the reactor. The reactor was then flushed twice with propylene at 100 p.s.i.g. after which 10.6 pounds of propylene was added. Polymerization was initiated by elevating the temperature of the reactor contents to 200° F. The polymerization was carried out at a temperature between 200 and 275° F. and at a pressure between 130 and 180 p.s.i.g. for 2 hours. At the end of the reaction period, the reactor was cooled and opened and the polymer was removed. The results of these two runs are set forth hereinbelow in Table III.

TABLE III

| Run No. | A | B |
|---|---|---|
| Reaction Product Preparation: | | |
| TiCl₄, grams | 43.2 | 43.2 |
| Al, grams | 1.95 | 1.95 |
| Mol Ratio TcCl₄/Al | 3.15 | 3.15 |
| Polimerization: | | |
| Triisobutylaluminum, grams [1] | 2.29 | 2.29 |
| Al-TiCl₄ reaction product, grams | 0.593 | 0.590 |
| Wt. Ratio Reaction Product/Triisobutylaluminum | 0.259 | 0.258 |
| Polymer Yield, grams | 166 | 571 |
| Productivity, gms. polymer/gm. catalyst/hr | 29 | 99 |
| Isotactic Content, percent [2] | 68 | 67 |

[1] The triisobutylaluminum was made up as a solution in cyclohexane which contained 0.167 gram triisobutylaluminum/cc. The proper amount of this solution (13.7 cc.) was then added to 500 cc. of cyclohexane, and the resulting solution was charged to the reactor.
[2] As determined by extraction with refluxing n-heptane.

From a consideration of the data in Table III, it is seen that a much greater yield is obtained when the catalyst used includes an aluminum-titanium reaction product which has been heated under a vacuum at an elevated temperature for an extended period of time. However, as will become apparent from a consideration of the succeeding examples, a catalyst containing either the purified or the unpurified reaction product gives greater yields than other catalysts, e.g., a catalyst consisting of an alkylaluminum and titanium trichloride.

*Example IV*

A control run was made in which pure titanium trichloride (free of aluminum and aluminum trichloride) was prepared and utilized with triisobutylaluminum as the catalyst for the polymerization of propylene.

In this run, titanium tetrachloride was refluxed for about 7 hours over tungsten wire at red heat in the presence of hydrogen. The resulting product was a slurry of titanium trichloride in titanium tetrachloride. This slurry was then heated at 400° F. at 0.05 mm. mercury absolute pressure to remove the excess titanium tetrachloride. The titanium trichloride thus produced was a purple powder.

Two hundred milliliters of prepurified cyclohexane was charged to a flask which was fitted with a stirrer. After flushing with nitrogen, 10 milliliters of a solution of triisobutylaluminum in cyclohexane which contained 0.15 gram per milliliter of the organoaluminum compound and 0.66 gram of the titanium trichloride prepared as described above were charged to the flask. An additional 12 milliliters of the organoaluminum solution was charged to the flask, and the flask contents were stirred together for about 30 minutes under a nitrogen atmosphere. The contents of this flask were then transferred to a 1-gallon reactor which had been previously charged with 1500 milliliters of prepurified cyclohexane. Heat was then supplied to the reactor, and propylene was pressured into the reactor until a pressure of 100 p.s.i.g. was reached. The propylene used was a pure grade propylene which had been previously purified by drying over silica gel and passing over high surface sodium dispersed on sodium chloride. Polymerization was almost immediately initiated, and as the pressure dropped, additional propylene was pressured into the reactor so as to maintain the pressure at approximately 120 to 140 p.s.i.g. The temperature was at all times between 200 and 250° F. After a total reaction time of 347 minutes, the reactor was vented and cooled, and the contents of the reactor were removed. The solid polymer which was recovered was washed two times in a Waring Blendor with isopropyl alcohol and dried overnight in a vacuum oven at 65° C. The weight of the dry polymer which was recovered was 100 grams. The productivity realized in this run was 4.55 grams of polymer per gram of catalyst per hour. It is seen that the product yield obtained when using a catalyst consisting of an organoaluminum compound and titanium trichloride is much lower than that obtained when employing the catalyst of this invention.

*Example V*

Commencing with the assumption that aluminum and titanium tetrachloride react to form a mixture of aluminum trichloride and titanium trichloride, a run was made in which a synthetic mixture of aluminum trichloride and titanium trichloride was used with triisobutylaluminum as the catalyst in the polymerization of propylene. In this run, 1500 milliliters of prepurified cyclohexane, 0.75 gram of titanium trichloride, which was identical to that employed in Example IV, 0.38 gram of aluminum trichloride and 3.75 grams of triisobutylaluminum were charged to a 1-gallon stirred reactor. After heating the reactor to 195° F., the reactor was pressured to 100 p.s.i.g. with a pure grade propylene which had been previously purified as described in Example I. Polymerization which was immediately initiated, was allowed to continue for 4 hours and 5 minutes, during which time the temperature was maintained at 205° F. As the pressure dropped because of the polymerization, intermittent charging of propylene was employed to maintain the pressure at 100 p.s.i.g. The polymer was recovered and dried by the same method described in the previous examples, 112 grams of dry polymer being obtained. This represents a productivity of 5.62 grams of polymer per gram of catalyst per hour. It is apparent that the product yield obtained when using a catalyst containing a synthetic mixture of aluminum trichloride and titanium trichloride is much lower than that obtained when using the catalyst of this invention.

*Example VI*

A run was made in which propylene was polymerized in the presence of a catalyst consisting of triisobutylaluminum and a commercial titanium trichloride (obtained from National Lead Company). This run was carried out in a stirred reactor at a temperature between 225 and 250° F. and at a pressure of 300 p.s.i.g. for 4.3 hours, using 1500 milliliters of prepurified cyclohexane as a diluent and a triisobutylaluminum to titanium trichloride mol ratio of 5.35 to 1. The productivity in this run was 22.8 grams of polymer per gram of catalyst per hour.

The above run represents a control run, and can be compared with the following run. A polymerization run was carried out in the same equipment used in the above run in which a pure grade propylene was polymerized using the catalyst of this invention. In this run, 2.1 grams of triisobutylaluminum, 0.6 gram of an aluminum-titanium tetrachloride reaction product and 1500 milliliters of prepurified cyclohexane were charged to a 1-gallon stirred reactor. In preparing the reaction product used, each of eight glass tubes was charged with 2 grams of aluminum powder and 44.4 grams of titanium tetrachloride. The tubes were then flushed with prepurified nitrogen, sealed and heated in a rocking autoclave for 18 hours at 400 to 435° F. The product was then transferred to unsealed glass tubes and heated under a vacuum for 18 hours at 400 to 500° F. Polymerization, which was immediately initiated upon charging of propylene to the reactor, was carried out at a temperature between 225 and 250° F. and at a pressure of 300 p.s.i.g. for two hours. The weight ratio of the aluminum-titanium tetrachloride reaction product to triisobutylaluminum was 0.286. The yield of polymer from this run was 621 grams, which represents a productivity of 64.5 grams of polymer per gram of catalyst per hour.

*Example VII*

Another control run was made in which the catalyst consisted of triisobutylaluminum and a commercial titanium trichloride. In this run, 1.16 grams of triisobutylaluminum, 0.3 gram of commercial titanium trichloride (obtained from Stauffer Chemical Company) and 1500 milliliters of prepurified cyclohexane were charged to a ½-gallon stirred reactor. The mol ratio of triisobutylaluminum to titanium trichloride was 3:1. Polymerization of a pure grade propylene was conducted in the presence of this catalyst at a temperature of 225° F. and at a pressure of 300 p.s.i.g. for a period of two hours. The yield of polymer from this run was 46 grams, representing a productivity of 15.7 grams of polymer per gram of catalyst per hour.

A run was made in which 1.16 grams of triisobutylaluminum, 0.3 gram of the reaction product of aluminum and titanium tetrachloride, prepared as described in Example VI, and 1500 milliliters of prepurified cyclohexane were charged to a ½-gallon stirred reactor. Propylene was then charged to the reactor, and the polymerization, which was immediately initiated, was carried out at a temperature of 225° F. and at a pressure of 300 p.s.i.g. for 2 hours. The yield of polymer in this run was 348 grams, representing a productivity of 119 grams of polymer per gram of catalyst per hour.

In the above examples, Examples I, II, III and the second paragraphs of Examples VI and VIII describe runs which show the very high productivities obtainable when utilizing the catalyst of this invention to polymerize propylene. These runs are to be compared with the run of Example IV in which a catalyst containing pure titanium trichloride was employed. Example V indicates that the high productivity obtainable when using the catalyst system of this invention cannot be obtained by using a caalyst consisting of an organoaluminum compound, pure titanium trichloride and pure aluminum trichloride. The runs described in the first paragraphs of Examples VI and VIII demonstrate that catalysts consisting of an organoaluminum compound and commercial titanium trichlorides are not as effective in the polymerization of propylene as the catalyst of this invention which comprises an organoaluminum compound and the reaction product of aluminum and titanium tetrachloride.

The polymers produced in accordance with this invention have utility in applications where solid plastics are used. They can be molded to form articles of any desired shape, such as bottles and other containers for liquids. Furthermore, they can be formed into pipe by extrusion.

As will be evident to those skilled in the art, many variations and modifications can be practiced within the scope of the disclosure of this invention. The invention resides in an improved polymerization process for propylene comprising the use of a novel catalyst composition as described herein and in the polymer so produced.

I claim:

1. A method for producing a solid polymer of propylene which comprises contacting propylene with a catalyst which forms on mixing components comprising (1) an organoaluminum compound corresponding to the general formula $AlR_3$, wherein R is a radical selected from the group consisting of alkyl, cycloalkyl, aryl, aralkyl, alkaryl, alkylcycloalkyl, and cycloalkylalkyl, said R containing from 1 to 10, inclusive, carbon atoms, and (2) the reaction product obtained by reacting aluminum and titanium halide at a temperature in the range of from about 300 to about 650° F. and at least partially removing the resultant volatile materials from the resulting reaction mixture, said contacting occuring in the present of a hydrocarbon diluent, liquid and inert under conditions of the method, at a temperature in the range of zero to 500° F. and at a pressure sufficient to maintain said diluent in the liquid phase; and recovering the solid polymer of propylene so produced.

2. A method in accordance with claim 1 wherein said catalyst comprises (1) an organoaluminum compound corresponding to the general formula $AlR_3$, wherein R is as indicated, and (2) the reaction product obtained by reacting aluminum and titanium tetrachloride at a temperature in the range of 300 to 650° F. for a period of from 0.1 to 20 hours, said resulting reaction mixture being heated under a vacuum to a temperature in the range of 250 to 800° F. for a period of from 10 to 20 hours.

3. A method in accordance with claim 1 wherein said catalyst comprises (1) an organoaluminum compound corresponding to the general formula $AlR_3$, wherein R is as indicated, and (2) the reaction product obtained by reacting aluminum and titanium tetrachloride at a temperature in the range of 300 to 650° F. for a period of from 0.1 to 20 hours, said resulting reaction mixture being extracted with a hydrocarbon at a temperature in the range of 150 to 280° F.

4. A catalyst composition formed by mixing (1) an organoaluminum compound corresponding to the general formula $AlR_3$, wherein R is a radical selected from the group consisting of alkyl, cycloalkyl, aryl, aralkyl, alkaryl, alkylcycloalkyl, and cycloalkylalkyl, said R containing from 1 to 10 inclusive carbon atoms, and (2) the reaction product obtained by reacting aluminum and titanium halide at a temperature in the range of 300 to 650° F. for a period of time in the range of 0.1 to 20 hours, and at least partially removing the resultant volatile materials from the reaction mixture.

5. A catalyst composition according to claim 4 wherein said organoaluminum compound is triisobutylaluminum and said titanium halide is titanium tetrachloride.

6. A catalyst composition according to claim 4 wherein said organoaluminum compound is triethylaluminum and said titanium halide is titanium tetrachloride.

7. In the preparation of a catalyst composition by reduction of a titanium halide to a lower valence state with a finely divided aluminum powder at a temperature of 300° to 650° F., and in an inert atmosphere, the improvement which comprises at least partially removing the resultant volatile materials from the reaction mixture and admixing the reduced titanium halide with an aluminum trialkyl.

8. The process of claim 7 in which the reaction mixture is extracted with an organic solvent.

9. The process of claim 7 in which the reaction mixture is treated by stripping at a reduced pressure.

10. The process of claim 7 in which the titanium halide is $TiCl_4$.

11. A method according to claim 7 in which the volatile materials formed from the reducing element are removed directly after the reduction.

References Cited by the Examiner

UNITED STATES PATENTS

| | | | |
|---|---|---|---|
| 2,874,153 | 2/1959 | Bowman et al. | 260—93.7 |
| 2,880,121 | 3/1959 | Thompson | 260—93.7 |
| 2,880,199 | 3/1959 | Jezl | 260—93.7 |
| 2,886,561 | 5/1959 | Reynolds et al. | 260—94.9 |
| 2,899,414 | 8/1959 | Mertes | 260—93.7 |
| 2,980,660 | 4/1961 | Ralls | 260—93.7 |
| 3,001,951 | 9/1961 | Tornqvist et al. | 260—93.7 |
| 3,002,962 | 10/1961 | Claiborne et al. | 260—93.7 |

FOREIGN PATENTS

| | | |
|---|---|---|
| 533,362 | 5/1955 | Belgium. |
| 1,132,506 | 11/1956 | France. |
| 1,135,808 | 12/1956 | France. |
| 1,144,710 | 4/1957 | France. |

OTHER REFERENCES

Ruff et al.: "Zeitschr. Anorg. Chemie" 128 (1923), 81–95, page 84 replied on.

JOSEPH L. SCHOFER, *Primary Examiner.*

BEN E. LANHAM, LESLIE H. GASTON, MORRIS LIEBMAN, JULIUS GREENWALD, TOBIAS E. LEVOW, WILLIAM H. SHORT, *Examiners.*

W. J. VANBALEN, E. J. SMITH, M. B. KURTZMAN, R. D. LOVERING, S. H. BLECH, E. M. OLSTEIN,
*Assistant Examiners.*